United States Patent [19]

Eyb

[11] 4,440,429
[45] Apr. 3, 1984

[54] BUMPER FOR A MOTOR VEHICLE, IN PARTICULAR A PASSENGER CAR

[75] Inventor: Wolfgang Eyb, Leonberg, Fed. Rep. of Germany

[73] Assignee: Dr. Ing. h.c.F. Porsche AG, Fed. Rep. of Germany

[21] Appl. No.: 311,972

[22] Filed: Oct. 16, 1981

[30] Foreign Application Priority Data

Oct. 18, 1980 [DE] Fed. Rep. of Germany ....... 3039365

[51] Int. Cl.$^3$ ............................................. B60R 19/08
[52] U.S. Cl. .................................. 293/120; 293/122; 293/132; 293/135; 293/155
[58] Field of Search ............... 293/102, 120, 121, 122, 293/130, 131, 132, 135, 136, 154, 155

[56] References Cited

U.S. PATENT DOCUMENTS 1,935,447 11/1933 Hoffman ............................ 296/120
3,850,466 11/1974 Yepis .................................... 296/132
3,877,741 4/1975 Wilfert et al. ....................... 296/120

*Primary Examiner*—Robert R. Song
*Attorney, Agent, or Firm*—Craig & Burns

[57] ABSTRACT

A shock-absorbing bumper arrangement for a motor vehicle, comprising a cover made of an elastic material and a beam is constructed so as to eliminate the use of hydraulic damper struts by constructing the beam of fiberglass-reinforced plastic (at least in its transversely extending part) and fixing the beam to body frame elements in the manner of a 2-point loaded beam at two locations spaced relatively far apart outside of a middle longitudinal plane of the vehicle. The beam is constructed of a transverse part and approximately longitudinally directed support parts which secure the beam to body frame elements. In accordance with one embodiment, the transverse part and the supports of the beam are unitarily constructed as a single piece, while, in accordance with a second embodiment, the transverse part, which is formed of fiberglass-reinforced plastic, is formed as a part that is separate from the support parts, which support parts are formed of a light metal and plugged into hollow ends of the beam. Forwardly directed horn-like projections are provided on the transverse part, and obliquely directed horn-like projections are provided at a transition area between the transverse part and the support parts.

6 Claims, 5 Drawing Figures

U.S. Patent
Apr. 3, 1984
4,440,429
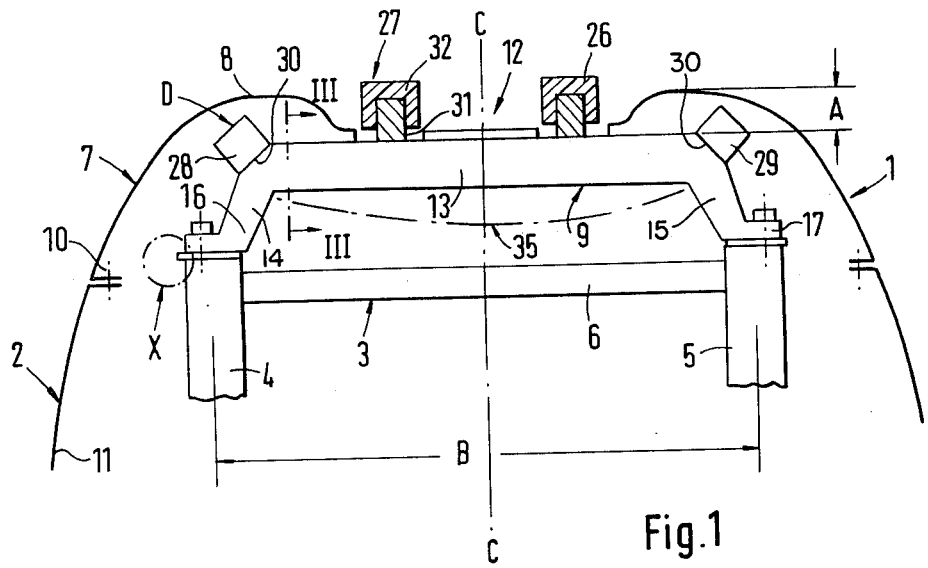
Fig.1
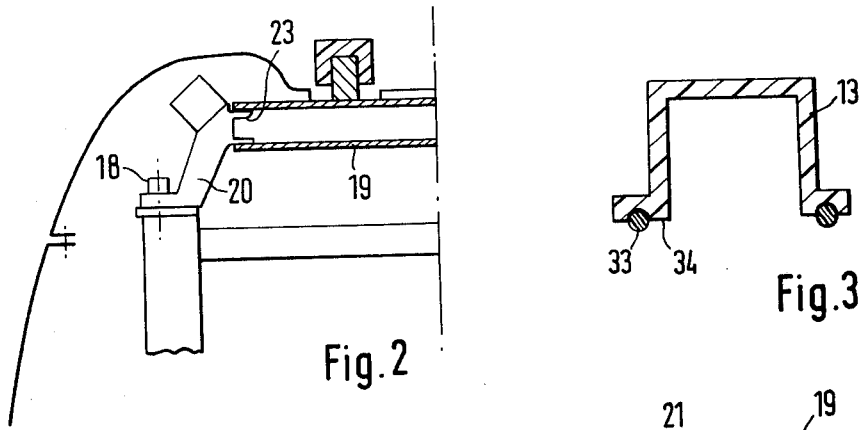
Fig.2
Fig.3
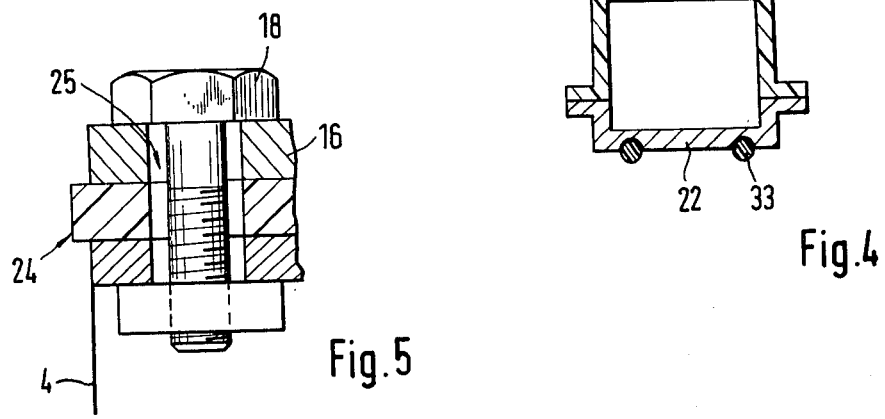
Fig.5
Fig.4

BUMPER FOR A MOTOR VEHICLE, IN PARTICULAR A PASSENGER CAR

BACKGROUND AND SUMMARY OF THE INVENTION

The invention pertains to a bumper for a motor vehicle, in particular a passenger car, which comprises a cover made of an elastic material and a dimensionally stable beam.

In the case of a known bumper DE-OS No. 28 25 838) of the type mentioned in the introduction, the beam is supported on hydraulic dampers, i.e., the beam has a type of rigidity such that energy is absorbed solely via the dampers. This design involves the disadvantage, however, that the hydraulic dampers cause additional costs and also contribute to increasing the weight of the vehicle.

Thus, a primary object of the present invention is to create a bumper with a cover and a beam, the design of which avoids the above-indicated disadvantages.

According to a preferred embodiment of the invention, this task is accomplished by making the beam, which is surrounded at least in sections by the cover of elastic material, of a fiberglass-reinforced plastic and connecting it to body elements without dampers in the manner of a beam on two supports that are relatively far outside of a middle longitudinal plane of the vehicle. For this purpose it is advantageous for the beam to feature a transverse part and supports running approximately in the longitudinal direction of the vehicle; the ends of these supports are designed for securing the beam by means of attachment elements at the body elements. The transverse part and the supports are interconnected as a single piece. The transverse part, which preferentially features a pipe-shaped cross section, consists of fiberglass-reinforced plastic. Alternatively, the supports are formed by separate parts inserted into the transverse part. In order to achieve a good connection, receiver sections of the parts extend into the transverse part. The parts consists of light metal. Between the ends of these supports and the receiver elements are spacers made of elastic material, and at the ends there are groove openings for the attachment devices. Horns made of an elastic material are mounted at the beam. Each horn features an internal support element which is harder than the rest of the horn.

Two horns located some distance apart are mounted at the transverse part. In approximately the transition area between the transverse part and each support, there is a horn which is mounted obliquely to the longitudinal direction of the vehicle. The transverse part is equipped with fiberglass-reinforced plastic rods, preferentially along upright cross section areas.

Principal advantages which are achieved by means of the invention are the fact that, because of the arrangement and shape of the beam, the beam absorbs and consumes the shock energy as defined bending, thereby making hydraulic dampers unnecessary and providing savings in cost and weight.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 1 shows a schematic top view of a front section of a vehicle with a bumper in accordance with a preferred embodiment of the invention.

FIG. 2 shows a partial view similar to FIG. 1 of a modified design.

FIG. 3 shows a section along the III—III line of FIG. 1 on an enlarged scale.

FIG. 4 shows a section similar to FIG. 3, but of the FIG. 2 embodiment.

FIG. 5 shows a detail X of FIG. 1 on an enlarged scale.

DETAILED DESCRIPTION OF THE PREFERRED EMBODIMENTS

In the area shown, the motor vehicle 1 has a front part 2 of a body 3. The body 3 has longitudinal beam-like body elements 4, 5, which are interconnected via a transverse beam 6. To the body 3 is connected a bumper 7, which comprises an elastic cover 8 and a dimensionally stable beam 9. The cover 8 encloses the beam 9 and is connected at 10 with a side part 11 of the body 3.

In the forward area of the bumper 7, the cover extends with a distance A between it and beam 9, on the one hand, and on the other hand, is brought up to beam 9 at a central area so as to create a recess 12.

The beam 9 consists of fiberglass-reinforced plastic (proportion of glass—approximately 35–40%), and, in the fashion of a beam, it is connected to body elements 4, 5 on two supports relatively far apart (distance B), well outside the middle longitudinal plane C—C of the vehicle. Body elements 4, 5 extend either inside the wheels or within the wheel gauge (not shown).

The beam 9 itself is formed by a transverse part 13 and supports 14, 15 which run approximately in the longitudinal direction of the vehicle. Supports 14, 15 feature ends 16, 17 which extend to longitudinal body elements 4, 5 and are secured by means of attachment elements 18 (bolts).

The transverse part 13 and the supports 14, 15 are unitarily interconnected. However, in accordance with the FIG. 2 embodiment, only transverse part 19 is manufactured from fiberglass-reinforced plastic and light metal supports 20 are separate parts which are inserted into the ends of transverse part 19. As can be seen from FIG. 4, the transverse part 19 has a pipe-shaped cross section and consists of two half-shells 21, 22. At the supports 20 formed of light-metal, there are receiver sections 23 which extend into the transverse part 19.

Between ends 16, 17 and body elements 4, 5, there are spacers 24 made of elastic material (FIG. 5). In addition, at ends 16, 17, there are groove openings 25 for the attachment elements 18. Thus, the stresses which arise in the attachment area of supports 16 and 17, when beam 9 is bent, are reduced, at least to a certain extent.

At beam 9, there are also horns (horn-like projections) 26, 27, 28, 29 made of an elastic material; horns 26, 27 are spaced apart, but are inside of body elements 4, 5 at transverse part 13, while horns 28, 29 are at transition areas 30 between transverse part 13 and supports 14, 15. The horns 28, 29 are directed obliquely relative to the longitudinal direction of the vehicle in order to absorb the impact energy which is generated in an oblique impact (direction D) against the vehicle.

Each horn 26 comprises an internal support element 31 which is surrounded by a horn casing 32 and is harder that the latter.

In addition, at transverse part 13, which has an open cross section, there are plastic rods 33 which feature a circular cross section (glass portion 60-70%) at the upright cross section areas 34. Similarly, at transverse part 19, rods 33 are also provided; in this case, widely spaced on a vertical wall of shell 22.

If bumper 7 is compressed via the horns 26, 27 (for instance, at a speed of 8 km/hr), then initially a portion of the energy is consumed by horns 26, 27. Then the beam 9 is deformed approximately as indicated by bending line 35, and it absorbs the rest of the energy.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. A shock absorbing bumper arrangement for a motor vehicle, in particular a passenger car, which comprises a cover made of an elastic material and a dimensionally stable beam, characterized by the fact that the beam is surrounded, at least in sections, by said cover and consists of fiberglass-reinforced plastic, said beam being fixed to body frame elements in the manner of a beam at two locations located relatively far apart outside of a middle longitudinal plane of the vehicle, the beam comprises a transverse part and supports which run approximately in the longitudinal direction of the vehicle and have ends which are designed to secure the beam, by means of attachment elements, to the body frame elements, and the transverse part and the supports of the beam are unitarily constructed as a single piece.

2. A shock absorbing bumper arrangement for a motor vehicle, in particular a passenger car, which comprises a cover made of an elastic material and a dimensionally stable beam, wherein the beam is surrounded, at least in sections, by said cover and consists of fiberglass-reinforced plastic, said beam being fixed to body frame elements in the manner of a beam at two locations located relatively far apart outside of a middle longitudinal plane of the vehicle, the beam comprises a transverse part and supports which run approximately in the longitudinal direction of the vehicle and have ends which are designed to secure the beam, by means of attachment elements, to the body frame elements, and wherein the transverse part is tubular and comprises fiberglass-reinforced plastic and said supports are formed by parts that are separate from the transverse part and inserted into the transverse part.

3. A bumper arrangement in accordance with claim 2, characterized by the fact that receiver sections of said supports extend into the transverse part.

4. A bumper arrangement in accordance with claim 3, characterized by the fact that said supports consist of light metal.

5. A shock absorbing bumper arrangement for a motor vehicle, in particular a passenger car, which comprises a cover made of an elastic material and a dimensionally stable beam, wherein the beam is surrounded, at least in sections, by said cover and consists of fiberglass-reinforced plastic, said beam being fixed to body frame elements in the manner of a beam at two locations located relatively far apart outside of a middle longitudinal plane of the vehicle, the beam comprises a transverse part and supports which run approximately in the longitudinal direction of the vehicle and have ends which are designed to secure the beam, by means of attachment elements, to the body frame elements, and between said ends of the supports and said body frame elements, there are spacers made of elastic material, and, at the ends, there are openings for the attachment devices.

6. A bumper arrangement in accordance with claim 5, wherein said attachment devices are bolts.

* * * * *